…

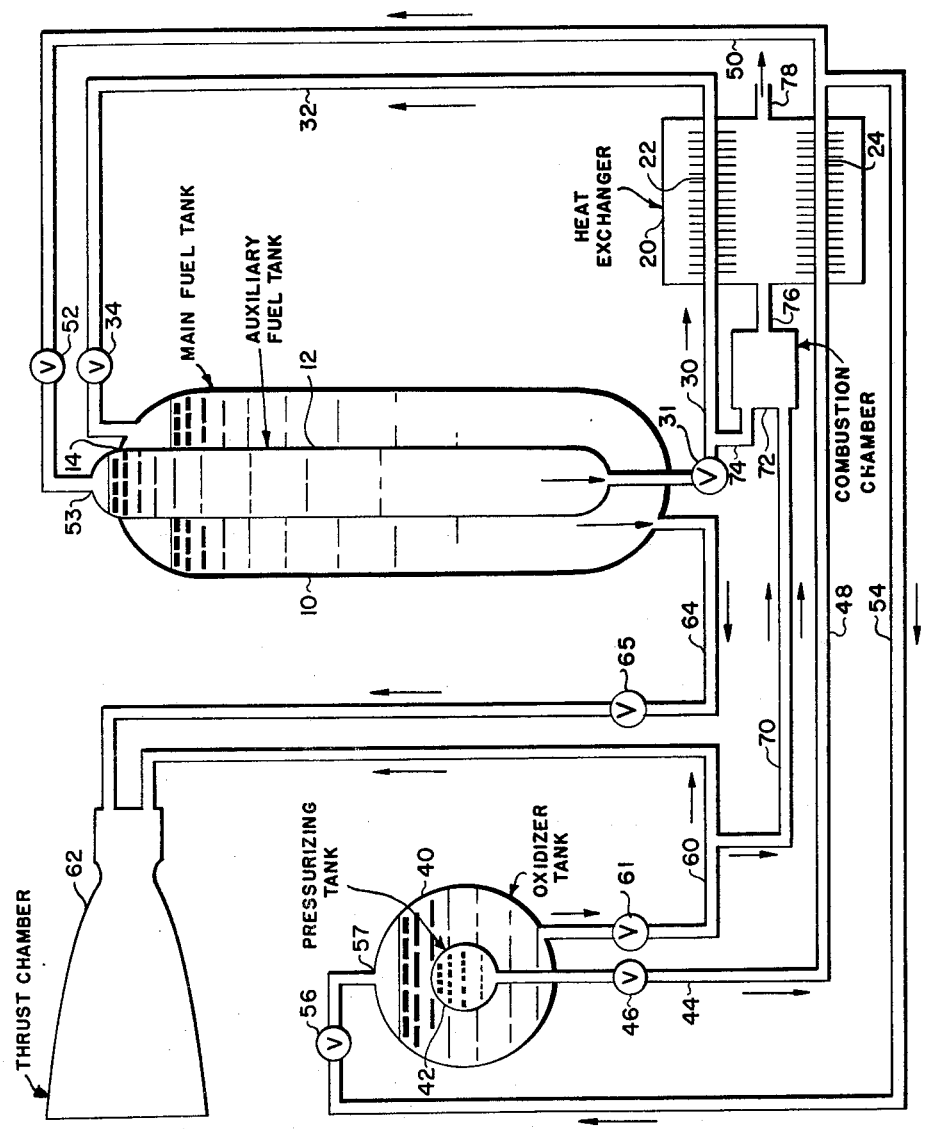
INVENTOR.
JOHN N. BARGER
CHARLES W. HURTER
ERIC PERRY
SIDNEY G. RUMBOLD
BY
ATTORNEY

United States Patent Office 3,136,121
Patented June 9, 1964

3,136,121
SYSTEM FOR PRESSURIZING AND EXPELLING CRYOGENIC LIQUIDS
John N. Barger, West Covina, Charles W. Hurter and Eric Perry, Pasadena, and Sidney G. Rumbold, Claremont, Calif., assignors to Aerojet-General Corporation, Azusa, Calif., a corporation of Ohio
Filed Feb. 12, 1960, Ser. No. 8,426
5 Claims. (Cl. 60—35.6)

This invention relates to a pressurization system for fluids and more particularly to pressurization and expulsion of liquid propellants used in rocket space vehicles.

Present pump-fed propulsion systems exhibit inherent limitations concerning pressure, temperature, and duration-of-run performance. Rockets that probe outer space require propellant systems that are operable under extreme temperature and pressure conditions. The characteristics of liquid propellants in rarified environments, through which the rocket must operate present problems in relation to smooth operation and restart ability with existing propellant pump equipment.

Gaseous pressurization systems also are used presently in multistage vehicles either solely or in combination with mechanical pumping devices to expel liquid propellants. The gases are retained in a gaseous state thereby having the twofold problem of the extreme size and weight of containers required to house the gases. When required to operate in combinations with mechanical pumping equipment, certain interactions may result which require sacrifice in weight and loss of efficiency of the pressurization system.

Since rockets impose definite volume and weight limitations on related components, optimum efficiency of the pressurization system is important for accomplishing the intended mission.

The present invention utilizes liquid gases to pressurize the system thereby reducing the storage space and weight. The subject pressurization system operates in part upon the change in volume of gaseous liquid expellants created by conversion from the liquid state to the gaseous state. For example, approximately 800 cubic feet of gas are produced from each cubic foot of liquified hydrogen at normal temperature and pressure. The absence of rotating components and dynamic shaft seals removes many of the causes of malfunction and technical difficulties inherent in pump-fed systems. The large liquid to gas ratio results from vaporization of liquid gases while subsequent heating of the gas enables the subject pressurization system to operate with increased efficiency in contrast to existing systems. The duration of propellant flow and weight of the system result in a configuration which is competitive with existing systems when used in advanced space probe and planetary missions. Adequate pressure regulation and pressurization system control response is achieved by pressure regulation and detailed design of gas flow passages. Reignition of the system can be achieved in flight and intermediate coasting periods are possible using automatic programing units in combination with the present invention.

In accordance with the present invention, the pressurization system utilizes a liquid propellant to function both as a pressurizing gas and as a propellant. The device of the present invention may also be adapted to commercial pressurization systems operating on multiliquid flows.

Generally described, the present invention is a pressurizing and expelling system employing a liquid gas which is vaporized and heated and thereafter ducted to a second chamber containing a liquid propellant that is pressurized by the warm low density gas. A similar principle is adapted to a second liquid gas circuit which contains in its second chamber an oxidizer liquid that is pressurized and subsequently expelled in the liquid state. The fuel and oxidizer liquids are expelled into a thrust chamber to be ignited by some external means.

The principal object of this invention is to provide a pressurization system operating on the volume and pressure change produced upon the transfer of liquid gas from the liquid to a gaseous state.

Another object of this invention is to provide a tank containing a liquid gas under slight pressure which is received by a main propellant tank at a slightly lower pressure in order to eliminate the insulation required by the tank at higher pressure and reduce the insulation required by the liquid gas tank system.

The invention will be better understood from the following detailed description of components and arrangement of equipment. The accompanying schematic drawing illustrates the invention applied to a rocket propulsion system which utilizes low temperature liquid gas propellants.

In the drawing, a main fuel tank 10 having a substantially cylindrical shape with substantially spherical shaped ends receives an auxiliary fuel tank 12 having substantially the same configuration as tank 10 although smaller. Auxiliary tank 12 protrudes from the uppermost portion of tank 10 at the joint 14.

A heat exchanger 20, which may be of the commercial type, is formed with double tubes 22, 24 that have transversely extending fins. A conduit 30 passing through a pressure regulator valve 31 connects the auxiliary tank 12 with the tube 22 of the heat exchanger 20. A conduit 32 connects the heat exchanger tube 22 with the uppermost portion of the main fuel tank 10 and has interposed therein a pressure regulator valve 34.

The second pressurization or oxidizer circuit includes a substantially spherically shaped oxidizer tank 40 which receives a smaller spherical tank 42. A conduit 44 leading from tank 42 passes through a pressure regulator valve 46 into a second conduit 48 which terminates in the heat exchanger 20. The finned tube 24 of the heat exchanger is contiguous with conduit 48 and is fixedly attached to the conduit 50. Regulator valve 52 is interposed in conduit 50 which passes therethrough and thereafter enters the auxiliary fuel tank of the first pressurization circuit at point 53. Conduit 54 branches from conduit 50 and passes through the pressure regulator 56 and thereafter enters the uppermost portion of substantially spherical tank 40 at point 57. Conduit 60 passing through a pressure regulator valve 61 leads from the lowermost portion of spherical oxidizer tank 40 and terminates in the rocket thrust chamber 62. A comparable conduit 64 passing through a pressure regulator valve 65 leads from the lowermost portion of the main fuel tank 10 and also leads to the thrust chamber 62. A conduit 70 branching from conduit 60 leads to a conventional gas generator or combustion chamber 72. A similar branch conduit 74 leads from conduit 30 into the gas generator or combustion chamber 72. A single heat passageway 76 leads into the heat exchanger 20. The exhaust heat from the heat exchanger 20 is transmitted therefrom by the passageway 78 to the atmosphere or to auxiliary devices such as control jets.

An example of appropriate material for construction of the auxiliary fuel tank 12 is aluminum and having an inside diameter of 13 inches and wall thickness 0.04 inch resulting in a volume of 14.8 cubic feet. The spherical tank 42 contained within the tank 40 is constructed of a high-strength steel or equivalent having an inside diameter of 25 inches and a wall thickness of 0.25 inch resulting in a volume of 4.8 cubic feet.

An example of the heat exchanger 20 is one of conventional double tube transverse fin configuration constructed of thermally efficient metal. Based on a copper construction and a heat flux requirement of 3.8 B.t.u. per second per square inch, the heat exchanger 20 has a tube length being 4.5 feet and the internal tube diameter being 0.63 inch.

An example of a suitable gas generator or combustion chamber 72 results in having a generally tubular configuration, an inside diameter of 0.63 inch and having a conventional electric-pyrotechnic or equivalent electric ignition system.

Optimum results of the subject pressurization and expulsion system are obtained when operating with liquid hydrogen used as the fuel and contained within both the main fuel tank 10 and the auxiliary fuel tank 12. A complementary oxidizer, liquid oxygen, is carried within the substantially spherical tank 40. Helium gas is contained within the spherical tank 42. The fuel or liquid hydrogen tank 10 has a tank pressure of 150 p.s.i. absolute and a weight flow rate of 8.3 pounds per second. The oxidizer or liquid oxygen has a tank pressure of 150 p.s.i. absolute and a weight flow rate of 41.4 pounds per second.

The liquid hydrogen pressure within the auxiliary fuel tank 12 is 185 p.s.i. absolute and has a weight flow rate of 0.32 pound per second. The temperature of the gases at the heat exchanger 20 is 39° Rankine at the inlet in conduit 30 and 600° Rankine at the outlet in conduit 32.

The liquid hydrogen is ducted into the gas generator or combustion chamber 72 through the conduit 74 and the liquid oxygen ducted through the conduit 70 flows into the same chamber at a chamber pressure of 50 p.s.i absolute at a weight flow rate of 0.04 pound per second. The gases are ignited in any conventional manner. The heat exchanger inlet temperature of the combusted reactants is 1730° Rankine in conduit 76 and the heat exchanger outlet temperature being 740° Rankine in conduits 78.

The helium gas contained within the spherical tank 42 is at initial storage pressure of 4000 p.s.i. absolute and has a weight flow rate of 0.16 pound per second.

These parameters of all examples are given by way of example only, and not by way of limitation.

The following description indicates operation of the subject pressurization system under typical conditions. Liquid hydrogen is charged in the main and auxiliary fuel tanks 10 and 12, liquid oxygen is charged in the substantially spherical oxidizer tank 40 and helium is charged into the pressurizing tank 42. Liquid oxygen passing through conduits 60, 70 and liquid hydrogen passing through conduits 30, 74 enter the combustion chamber 72 and are ignited by an electrical-pyrotechnic means or in any other conventional manner to create hot gases at a moderate pressure. The resultant heat is passed through conduit 76 into the heat exchanger 20.

The gas generator or combustion chamber 72 is used for expediency and a solar heat generator or electrical heaters operating on batteries may be substituted to effect similar results. From the foregoing discussion, it is evident that any heat generating device may be used in combination with the heat exchanger.

Liquid hydrogen passing from the auxiliary fuel tank 12 through the conduit 30 and entering the heat exchanger 20 is transformed from the liquid state into the gaseous state changing temperature from 39° Rankine to 60° Rankine. Gaseous hydrogen flows from the heat exchanger 20 through conduit 32 and through the regulator valve 34 into the uppermost portion of the main fuel tank 10, the pressure thereof forcing the liquid hydrogen contained therein to be expelled through the conduit 64 into the rocket thrust chamber 62. A similar sequence of events occurs when the helium contained within tank 42 passes through the conduit 44 by opening regulator valve 46 and through conduit 48 to enter the heat exchanger 20 at tube 24. The helium is heated in the gaseous state, rising in temperature from 85° Rankine to 600° Rankine, and is henceforth ducted through conduit 54, pressure regulator valve 56, and into the uppermost portion of the oxidizer tank 40. This resultant pressure generated causes the liquid oxygen contained therein to pass through conduit 60 and be expelled into the thrust chamber 62. A portion of the gaseous helium in the heat exchanger 20 is also passed through the conduit 50 through the regulator valve 52 and into the uppermost portion of the auxiliary fuel tank 12 to create a pressure on the liquid hydrogen contained within the auxiliary tank. The helium gas pressure in the auxiliary tank 12 is in the nature of a safety precaution to prevent a pressure drop or a drop in the weight-flow rate of the liquid hydrogen entering the heat exchanger.

The liquid oxygen and liquid hydrogen entering the thrust chamber 62 may be ignited by any conventional means.

It will be recognized that modifications may be made within the scope of this invention. For example, any means which transposes liquid gases from the liquid state to the gaseous state may be used to replace the heat generator 72. The examples for the fuel and oxidizer given and the gas and the liquid gas used to pressurize the system may be changed without departing from the spirit of the invention. The pressurizing system also can be adapted to many commercial installations in which a rapid and sustained fluid flow must be maintained.

The present invention can be adapted to operate on a monopropellant fuel system without departing from the spirit of the invention. Examples of these fuels are: hydrogen peroxide, hydrazine, non-methylhydrazine, unsymmetrical dimethyl hydrazine, and ethylene oxide. The pressurizing gases acting on the fuel and oxidizer can be any cryogenic material such as: fluorine, ammonia, ethylene oxide, Freon, methyl chloride, nitrogen, and ethylene oxide all charged initially in the liquid state.

This invention is not to be limited to the single embodiment illustrated which is given for illustration rather than limitation and is limited only by the scope of the appended claims.

We claim:

1. A rocket fuel system comprising: a main tank and an auxiliary fuel tank containing pressurized liquid propellant fuel, a first closed receptacle containing a pressurized liquid oxidizer, a second closed receptacle containing a pressurized gas, a heat exchanger operatively receiving said pressurized liquid propellant from said auxiliary fuel tank and said pressurized gas from said second closed receptacle and capable of transferring said liquid into the gaseous state and of reducing the density of said gas, means for ducting said liquid in the gaseous state from said heat exchanger to said main fuel tank means for ducting said gas from said heat exchanger to said auxiliary fuel tank and to said first closed receptacle, whereby said auxiliary fuel in the gaseous state and said pressurized gas increase the pressure within said main fuel tank and said first closed receptacle, and a thrust chamber receiving ducting means from said main fuel tank and from said first closed receptacle.

2. A rocket fuel system as defined in claim 1 in which said auxiliary fuel tank is positioned within said main fuel tank and said second closed receptacle is positioned within said first closed receptacle.

3. A rocket fuel system as defined in claim 1 wherein said pressurized propellant fuel is liquid hydrogen, said oxidizer is liquid oxygen, and said pressurized gas is helium.

4. A rocket fuel system as defined in claim 3 wherein said fuel and oxidizer are initially in the cryogenic state.

5. A rocket fuel system as defined in claim 1 and in addition, a combustion chamber, conduits leading from said auxiliary fuel tank and said first closed receptacles into said combustion chamber, and a ducting means for transferring heat from said combustion chamber to said heat exchanger.

References Cited in the file of this patent

UNITED STATES PATENTS

| | | |
|---|---|---|
| 2,395,113 | Goddard | Feb. 19, 1946 |
| 2,523,008 | Goddard | Sept. 19, 1950 |
| 2,532,708 | Goddard | Dec. 5, 1950 |
| 2,852,916 | Hearn et al. | Sept. 23, 1958 |
| 2,932,941 | Ayers et al. | Apr. 19, 1960 |
| 2,935,846 | Neale et al. | May 10, 1960 |

FOREIGN PATENTS

| | | |
|---|---|---|
| 1,021,206 | Germany | Dec. 19, 1957 |

OTHER REFERENCES

Time Magazine, Vol. LXXIV, No. 25, December 21, 1959 (page 37 relied on).